Patented Mar. 30, 1937

2,075,445

UNITED STATES PATENT OFFICE 2,075,445

METHOD OF FORMING CERAMIC BODIES

Hobart M. Kraner, Louisville, Ky., assignor to Feldspathic Research Corporation, New York, N. Y., a corporation of Delaware No Drawing. Application August 27, 1932, Serial No. 630,703

9 Claims. (Cl. 25—156)

My invention relates to ceramic compositions and particularly to compositions employed in the manufacture of molded refractory elements such as tiles, porcelain insulators and other bodies.

One object of my invention is to conserve the life of the dies, particularly of steel dies, employed in molding such bodies.

Another object of my invention is to provide a more accurately-formed ceramic body by reducing its firing shrinkage.

Another object of my invention is to reduce the temperature at which a ceramic body may be vitrified.

Another object of my invention is to increase the firing range of a ceramic body.

Another object of my invention is to provide a ceramic composition that shall be free from, or have low content of, harsh abrasive material such as flint.

Another object of my invention is to provide a refractory or ceramic body that shall be better adapted for firing in an electrically heated kiln or furnace than previous ceramic bodies of which I am aware.

Another object of my invention is to reduce the number of grades of such bodies necessary to be manufactured.

Another object of my invention is to employ any one, or a combination of multiplicity of fluxes in a ceramic body to obtain long firing range thereof.

Another object of my invention is to utilize more economical fluxes, such as basalt, mica and other soft materials of low water content hitherto not employed.

A further object of my invention is to provide a vitreous body that shall be simple and durable in construction, economical to manufacture and effective in its operation.

Porcelain generally consists of clay, flint and feldspar, or clay and other non-plastic materials, like flint and feldspar, which are highly abrasive. Examples of such other materials are sillimanite, cyanite and andalusite.

Compositions containing such materials abrade or wear to such an extent the dies, such as steel dies, or other types of dies having substantially the same hardness as steel dies, in which dry-press bodies thereof are usually molded that clean-cut bodies cannot be obtained from the dies for a long period of time. Also, in the wet process, the harsh materials abrade the extruding machines.

As a result, the product is not uniform and the dies and portions of the extruding machines must be frequently replaced at considerable expense.

It has been suggested to bond talc or steatite with clay to obtain non-abrasive compositions but, by reason of short firing range, such compositions have not had extensive adoption.

By reason of the lack of control in firing and pressing bodies, such as tile, the manufacturers have usually maintained a range of four grades. The size control is difficult by reason of excessive shrinkage which is from ten to twelve per cent and the variation from the desired size is greater in proportion to the shrinkage.

By reason of the excessive temperatures required, refractory bodies have not been well adapted for firing in electric furnaces which are capable of maintaining oxidizing conditions, this being done only in special applications, but where it may be accomplished on a commercial scale, it has the very great advantage over the ordinary gas-fired kiln of precluding the use of saggers. Thus, the size and weight of the furnace charge is substantially reduced and production is materially enhanced by lower fuel cost.

It is my aim to overcome all of the disadvantages of abrasive, high-temperature and short-firing-range bodies of this kind and accordingly, in practicing my invention, I provide a composition or batch that is constituted substantially entirely of soft, low-temperature materials having a firing range substantially that of pyrophyllite, and has, in the finished state, a porosity of less than ten per cent.

One material of this kind which, to the best of my knowledge, has never before been employed either as a minor or major constituent of a ceramic composition, is the mineral pyrophyllite, or pencil stone, which is a hydrous aluminum silicate containing approximately sixty five percent silica ($SiO_2$) and twenty-eight percent alumina ($Al_2O_3$). It has a soapy consistency, like talc, but contains no magnesium.

The pyrophyllite, preferably as the major constituent, is combined with a binder, such as clay, up to thirty or forty percent, and is bonded with a small amount of flux, such as whiting (CaCO₃), talc (3MgO 4SiO₂H₂O), magnesite (MgCO₃), dolomite (CaCO₃.MgCO₃) or powdered mica.

Another suitable material for the purpose is a grade of basalt, the average hardness of which is less than that of a steel die, in which character, it is therefore, like pyrophyllite, adapted to the invention.

Such composition as I have provided in accordance with the invention are as follows:

| Composition | 1 | 2 | 3 | 4 | 5 | 6 | 7 | 8 | 9 | 10 | 11 | 12 | 13 |
|---|---|---|---|---|---|---|---|---|---|---|---|---|---|
| Basalt | | | | | | | | 90 | 20 | 25 | 50 | 35 | 50 |
| Pyrophyllite | 45 | 45 | 45 | 50 | 50 | 90 | 100 | | 80 | 25 | 50 | 25 | 25 |
| Talc | 25 | | | 10 | | | | | | | | | |
| Ball clay | 20 | 20 | 20 | 20 | 20 | 10 | | 10 | | 50 | | 25 | 15 |
| China clay | 10 | 10 | 10 | 5 | 10 | | | | | | | | |
| Mica | | 25 | | 10 | 10 | | | | | | | | |
| Whiting | | | 25 | 5 | 10 | | | | | | | | |
| Feldspar | | | | | | | | | | | | | 10 |

Other compositions produced are as follows:

| | | |
|---|---|---|
| Kentucky ball clay #4 | 15 | 15 |
| Kentucky ball clay (dark special) | 5 | 5 |
| Georgia china clay | 10 | 10 |
| Pyrophyllite | 53.4 | 65 |
| Talc | 10 | 3 |
| Whiting | 6.6 | 2 |

In the latter compositions, a firing shrinkage of only seven percent was obtained, as against the usual ten to twelve percent in the ordinary ceramic bodies.

Also, in firing ordinary porcelain ware, a temperature of from cone eight to cone fourteen is usually required, whereas, with the compositions of my invention, vitrification may be effected at a temperature as low as cone one.

By my invention, it is therefore clear that all of the abrasive, high-temperature and long-firing characteristics of ceramic compositions and bodies have been substantially modified in a manner providing a highly superior product in each of its qualities of accuracy of form, facility of firing, economy and adaptability to electric-furnace firing.

By reason of the low shrinkage values, it is also no longer necessary to provide the several grades of the bodies in accordance with size, and a substantial contribution to the ceramic art has been made generally.

While I have described particular forms of my invention, changes may be made therein without departing from the spirit and scope thereof, as set forth in the appended claims.

I claim as my invention:

1. A dry-pressed ceramic body comprising substantially only soft constituent material including pyrophyllite as a major constituent and having a long firing range and a hardness less than that of a steel die.

2. A raw ceramic dry-press batch comprising substantially only soft constituent material including pyrophyllite and having an average hardness less than that of a steel die.

3. A raw ceramic dry-press batch comprising substantially only soft constituent material including a major portion of pyrophyllite and having an average hardness less than that of a steel die.

4. A raw ceramic dry-press batch comprising substantially only soft constituent material including at least fifty-one per cent of pyrophyllite and having an average hardness less than that of a steel die.

5. A raw ceramic dry-press batch comprising substantially only soft constituent material including at least ninety per cent of pyrophyllite and having an average hardness less than a steel die.

6. The method of dry pressing ceramic bodies, which comprises mixing a batch of material having substantially the soft non-abrasive and long firing range character of pyrophyllite which will form the bodies to have in its dry-press form an average hardness less than the hardness of the batch of ordinary like ceramic bodies, in providing a die harder than the batch for forming the same into the bodies, and in successively dry-pressing the bodies from said harder die.

7. The method of forming ceramic bodies, which comprises mixing a batch of material having substantially the soft non-abrasive and long firing range character of pyrophyllite which will form the bodies to have in the dry-press form an average hardness less than the hardness of like bodies made from an ordinary dry-press batch and the finished bodies to have less than ten per cent porosity, in providing a die harder than any constituent of substantial proportion in the batch, in successively pressing portions of the batch in said die to form the bodies, and in firing the bodies at a given temperature for a predetermined length of time to have said porosity.

8. The method of forming ceramic bodies, which comprises mixing a batch of material having substantially the soft non-abrasive and long firing range character of pyrophyllite which will form the bodies to have in the dry-press form an average hardness less than the hardness of like bodies made from an ordinary dry-press batch, in providing a die harder than any constituent of substantial proportion in the batch, in successively pressing portions of the batch in said die to form the bodies, and in firing the bodies at a given temperature for a given length of time to render them at least partially vitrified.

9. A raw ceramic dry-press batch comprising constituent material including pyrophyllite, and having an average hardness less than that of a steel die.

HOBART M. KRANER.